United States Patent
Herges

(10) Patent No.: US 7,433,771 B2
(45) Date of Patent: Oct. 7, 2008

(54) UTILITY VEHICLE HAVING A PLURALITY OF ELECTRIC DEVICES WHICH ARE CONTROLLED BY AT LEAST ONE ELECTRONIC CONTROL DEVICE

(75) Inventor: Michael Herges, Korntal-Muenchingen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/707,176

(22) Filed: Feb. 16, 2007

(65) Prior Publication Data

US 2007/0250242 A1    Oct. 25, 2007

Related U.S. Application Data

(63) Continuation of application No. PCT/EP2005/008782, filed on Aug. 12, 2005.

(30) Foreign Application Priority Data

Aug. 18, 2004    (DE) .................. 10 2004 039 998

(51) Int. Cl.
*B60R 16/02* (2006.01)
*G06F 19/00* (2006.01)

(52) U.S. Cl. .................. 701/70; 701/41; 280/735

(58) Field of Classification Search .................. 701/41, 701/70; 307/10.1, 117; 280/735; 180/90; 74/512

See application file for complete search history.

(56) References Cited

U.S. PATENT DOCUMENTS

| | | | |
|---|---|---|---|
| 5,309,361 A | 5/1994 | Drott et al. | |
| 6,157,887 A | 12/2000 | Zittlau | |
| 6,295,890 B2 * | 10/2001 | Rixon et al. | 74/512 |
| 6,345,225 B1 | 2/2002 | Boehm et al. | |
| 6,591,927 B1 * | 7/2003 | Honekamp et al. | 180/90 |
| 6,804,564 B2 | 10/2004 | Crispin et al. | |
| 7,255,366 B2 * | 8/2007 | Davis et al. | 280/735 |
| 2001/0038241 A1 * | 11/2001 | Grote et al. | 303/112 |
| 2005/0057087 A1 * | 3/2005 | Ahnafield | 303/20 |

FOREIGN PATENT DOCUMENTS

| | | |
|---|---|---|
| DE | 40 29 334 A1 | 3/1992 |
| DE | 198 36 690 A1 | 2/2000 |
| DE | 100 65 118 A1 | 7/2002 |
| DE | 102 12 674 A1 | 10/2003 |
| EP | 1 032 518 B1 | 9/2000 |
| EP | 1 584 532 A1 | 10/2005 |

OTHER PUBLICATIONS

Form PCT/IB/326, PCT/IB/338, PCT/IB/373, and PCT/IB/237 with English translation (Fifteen (15) Pages).
International Search Report w/English translation dated Nov. 18, 2005 (Four (4) pages).

* cited by examiner

*Primary Examiner*—Tan Q Nguyen
(74) *Attorney, Agent, or Firm*—Crowell & Moring LLP

(57) ABSTRACT

A utility vehicle having several electric devices is described. The vehicle includes an electric steering device and/or an electric braking device, which are controlled by at least one electronic control device, in addition to a pedal unit having pedals, such as a gas pedal, a brake pedal and/or a clutch pedal, which are mounted on a pedal support. The at least one control device and the pedal unit may be incorporated in order to form an integrated component or module.

20 Claims, 1 Drawing Sheet

UTILITY VEHICLE HAVING A PLURALITY OF ELECTRIC DEVICES WHICH ARE CONTROLLED BY AT LEAST ONE ELECTRONIC CONTROL DEVICE

CROSS REFERENCE TO RELATED APPLICATIONS

This application is a continuation of PCT International Application No. PCT/EP2005/008782, filed Aug. 12, 2005, which claims priority under 35 U.S.C. § 119 to German Patent Application No. 10 2004 039 998.0 filed Aug. 18, 2004, the entire disclosures of which are herein expressly incorporated by reference.

BACKGROUND AND SUMMARY OF THE INVENTION

The present invention relates to a utility or commercial vehicle having a plurality of electric devices which are controlled by at least one electronic control device, such as electric steering devices, electronic engine controller, and electric brake devices.

Contemporary commercial vehicles contain multiple electric or electronic systems such as, for example, an electric brake system, an electric steering system, an electric engine controller, an electric pneumatic suspension, an electric damping system, an electric air conditioning system, etc., which are each controlled by an electronic control device. As a result, there are a relatively high number of control devices available in the vehicle. At the same time, these individual systems are becoming increasingly intelligent and require ever greater amounts of data from other systems contained in the utility vehicle, which gives rise to a networked structure. For example, the functions of the traction control system (TCS) and of the electronic stability program (ESP) can each access at least the brake controller and engine controller.

Some of these systems are safety-critical (for example brakes, steering system) which places increased demands on the corresponding control devices, for example in the form of fail-safe behavior, fail silent behavior or in the form of redundancies. For example, EP 1 032 518 B1 describes redundant control devices and a redundant data bus of an electronic or vehicle brake system for increasing the functional reliability. If such redundancies are necessary for safety reasons, a control device is usually provided in the cabin, and one on the frame of the utility vehicle. Likewise, additional electronic assemblies such as actuators or sensors are arranged spatially separated from one another on the utility vehicle, for example, so that data which is input via an input unit arranged in the cabin is conducted to control devices arranged on the frame. However, the increasing number of electric and electronic assemblies in utility vehicles leads to large costs of cabling and a large number of plug connections, which increases susceptibility to faults.

The embodiments of the present invention describe a utility vehicle having a plurality of electric devices which are controlled via at least one electronic control device, in such a way that the devices have a higher level of functional reliability.

The vehicle according to the invention includes a pedal unit which is normally present in utility vehicles, and which is combined with at least one of the control devices of the electric devices to form one assembly or one module. This arrangement shortens the line lengths between the pedals which are fitted with sensors and the associated control devices, for example between a potentiometer used as a distance sensor for the travel of the accelerator pedal, or a steering angle sensor which is arranged on the steering column near to the pedal, and the respective signal input of the control device. The assembly according to embodiments of the invention includes control devices and a pedal unit, and can be used as a junction point for the cabling between the cabin, which can generally be pivoted, and the frame. This is beneficial since the actuators and sensors are mostly arranged on the frame and the operator control elements, display devices and input devices are usually arranged in the cabin. Furthermore, the assembly can be prefabricated, which reduces fabrication costs.

The devices can be combined according to embodiments of the invention by utilizing a spatially close arrangement of the pedal unit and the control device or devices to form one physical unit. This can be done, for example, by attaching a pedal carrier and a housing of the control device or devices using flanges, inserting the control device or devices into a flange within the pedal carrier with the detachable locked connection, and by integrating elements of the pedal unit and the control device or devices in a single housing. Alternatively, the combination may be accomplished by integrating elements of the pedal unit and the control device or devices in a single housing and attaching or supporting the remaining components of the pedal unit on the common housing.

The assembly having at least one control device and the pedal unit preferably include at least one first plug connector strip for receiving cables from sensors, actuators or input devices and display devices in the cabin, and at least one second plug connector strip for receiving cables from sensors and/or actuators in the region of the frame. Since the at least one electronic control device is then itself arranged at the interface with the cabin, all the lines coming both from the cabin and from outside the cabin can then be connected directly to the at least one control device without, as in the prior art, being firstly routed via the plug connection at the junction point with the cabin. This considerably reduces the risk of faults from disrupted plug connections.

According to embodiments of the invention, it is unnecessary to place at least one control device in the cabin and at least one additional control device, connected thereto in a data-transmitting fashion, outside the cabin, in order to make direct contact with the actuators and sensors which are respectively located there.

The at least one control device can furthermore serve as a connecting point or gateway for pure cabin data buses and for data buses for other parts of the vehicle. In this situation, as well, the additional plug connections at the junction point with the cabin are eliminated.

Other objects, advantages and novel features of the present invention will become apparent from the following detailed description of the invention when considered in conjunction with the accompanying drawing.

BRIEF DESCRIPTION OF THE DRAWINGS

An exemplary embodiment of the invention is illustrated below in the drawing and explained in more detail in the following description. The single FIGURE.

DETAILED DESCRIPTION OF THE DRAWINGS

Figure 1:
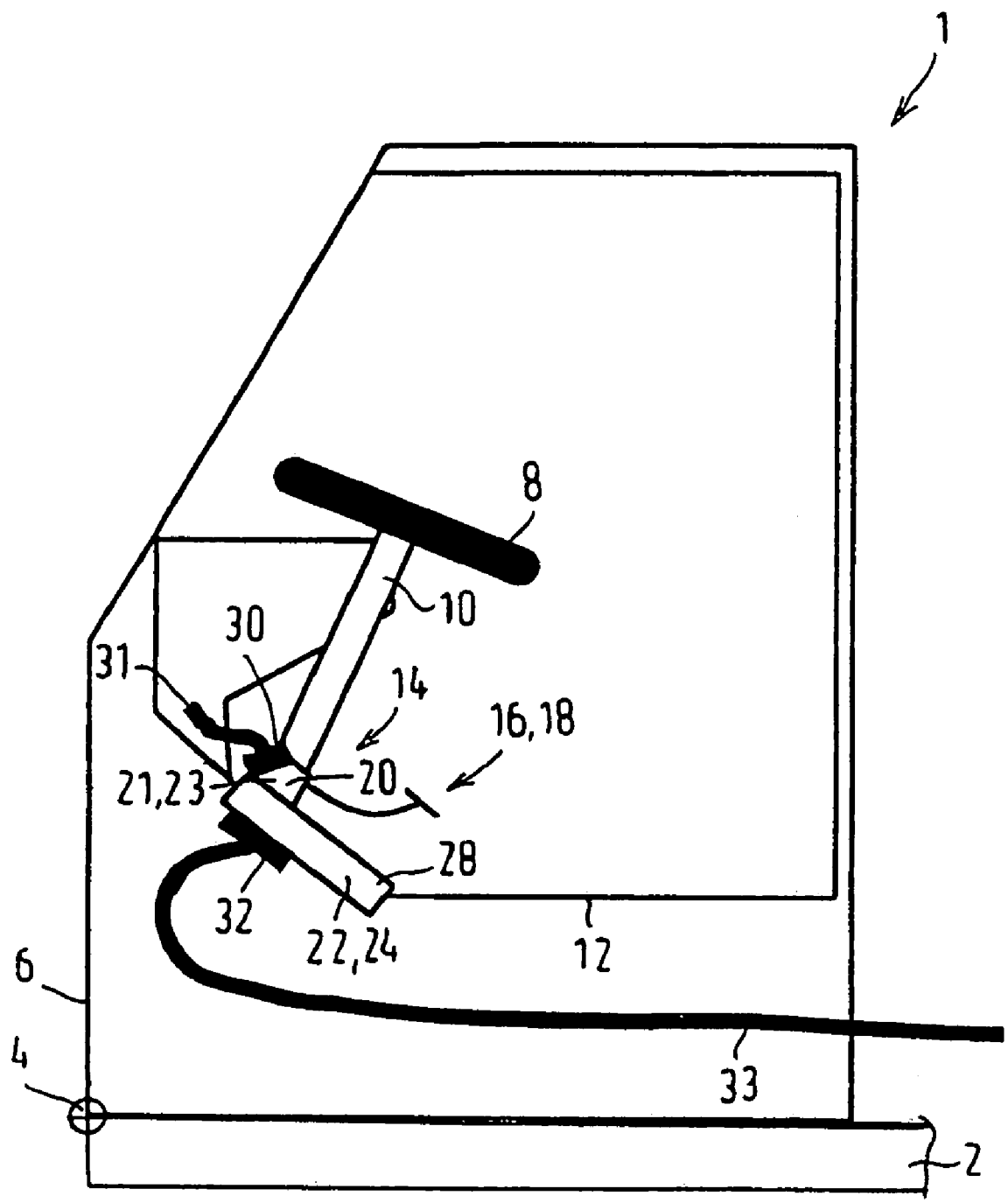
FIG. 1, is a schematic illustration of a cabin of a commercial vehicle having electric devices according to an embodiment of the invention.

The cabin of a utility or commercial vehicle, which is designated reference numeral 1 in FIG. 1, is mounted so as to be capable of tilting with respect to the frame 2 about a pivot axis 4 in the region of a front splash board 6. The steering column 10, which is fitted with a steering wheel 8, is arranged in the cabin 1, and directly adjacent to the steering column 10 a pedal unit 14 may be arranged on a floor 12 of the cabin 1. The exemplary pedal unit 14 includes a pedal carrier plate 20, to which control pedals such as an accelerator pedal 16 and a brake pedal 18 are connected in an articulated fashion, and on which, for example, is mounted the sensor system 21 for measuring pedal travel. In additional embodiments, other components which interact with the pedals 16, 18 may be arranged in or on the pedal unit 14. If there is no automatic transmission present, the pedal unit 14 can additionally include a clutch pedal. Furthermore, a steering angle sensor 23 may also be arranged on the pedal carrier plate 20, on which the steering column is also mounted in this embodiment.

The exemplary utility vehicle furthermore may have some or all of a plurality of electric or electronic systems, such as an electric brake system, an electric steering system, an electronic engine controller, an electronic air conditioning system, an electric pneumatic suspension system, an electric damping system, an electric air conditioning system etc. According to the invention, these systems may be controlled jointly by the two electronic control devices 22, 24.

In this embodiment, the individual actuators and sensors can be configured with their own electronic systems, which function as device or subsystem drivers, such as, for example, an ACC radar sensor, which makes available the conditioned data relating to objects detected in the surroundings via a data bus, or a pressure regulating module, which applies the brake pressure for a wheel or an axle and at the same time returns information about instantaneous brake pressure, rotational speed and lining wear via the data bus in response to a command transmitted via a data bus. However, it is also possible for purely electric elements to be used, such as, for example, the magnets of ABS valves or the pedal travel sensors of a foot brake module.

In different embodiments of the invention, an actuator sensor can, however, be linked to just one of the control devices or alternatively to both of them.

For safety reasons, when the brake system and/or the steering system of the two control devices 22, 24 are actuated, the control devices 22, 24 are each wired to operate in a fail-silent fashion, i.e. in such a way that following a failure or fault in one of the two control devices 22 or 24, control commands are no longer sent to the actuators assigned to the failed device, and the other functioning control device performs the function of the failed control device. According to the invention, the remaining functioning control device (22 or 24) is sufficient to prevent the vehicle from going into a dangerous state.

In addition, a failsafe electric power supply and a failsafe data transmission system may be provided so that both the brake system and the steering system can each be operated in a fully electrical fashion known as brake by wire and steer by wire. For example, in the brake system there is no pneumatic operation as a subordinate or backup safety system, but instead the brake function is controlled in a purely electrical fashion in every situation.

In the two control devices 22, 24, functions which extend over multiple systems, for example traction control or ESP and driver assistance functions such as, for example, automatic parking or ACC (adaptive cruise control), are also carried out without processing unnecessary data from a large number of individual system control devices having to be collected or distributed over data buses.

The two redundant control devices 22, 24 may be preferably combined with the pedal unit 14 to form a prefabricatable assembly or an integrated module 26. This can be implemented, for example, by accommodating the control devices 22, 24 in a housing 28 which is attached by flanges to the pedal carrier plate 20 of the pedal unit 14. Alternatively, they may be inserted into a compartment in the pedal carrier plate. The control devices 22, 24 and components for the pedal unit 14 may also be accommodated in a common housing.

The exemplary module 26 composed of the control devices 22, 24 and the pedal unit 14 may have a signal-transmitting and/or power-transmitting connection to sensors, actuators or input devices and display devices in the cabin 1 of the utility vehicle, and also to sensors and/or actuators arranged in the region of a frame 2 of the utility vehicle. For this purpose, the module 26 can have at least one first plug connector strip 30 for receiving cables 31 from sensors and/or actuators from the cabin 1, and at least one second plug connector strip 32 for receiving cables 33 from sensors and/or actuators from the region of the frame 2. The second plug connector strip 32, in one embodiment, may be preferably arranged on the side of the cabin floor 12 facing away from the cabin 1. The cables preferably implement at least one CAN data bus, which performs the communication function between the sensors 21, 23, actuators and control devices 22, 24.

The following description of reference numerals may be of assistance in understanding the preceding description, with reference to the drawing.

1 Cabin
2 Frame
4 Pivot axis
6 Splashboard
8 Steering wheel
10 Steering column
12 Cabin floor
14 Pedal unit
16 Accelerator pedal
18 Brake pedal
20 Pedal carrier plate
21 Sensor system
22 Control devices
23 Steering angle sensor
24 Control devices
26 Module
28 Housing
30 First plug connector strip
31 Cable
32 Second plug connector strip
33 Cable The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A utility vehicle, comprising:
   multiple electric devices comprising at least one of an electric steering device, an electronic engine controller and an electric brake device;
   at least two electronic control devices for jointly controlling the multiple electric devices;
   a pedal unit forming an integrated assembly with the at least two electronic control devices, the pedal unit having foot pedals mounted on a pedal carrier thereof; and
   at least one of an accelerator pedal, a brake pedal and a clutch pedal mounted on the pedal carrier.

2. The utility vehicle as claimed in claim 1, wherein the at least two electronic control devices are accommodated in a housing attached to the pedal carrier of the pedal unit via flanges.

3. The utility vehicle as claimed in claim 1, wherein the at least two electronic control devices and components of the pedal unit are disposed within a common housing.

4. The utility vehicle as claimed in claim 1, further comprising:
at least one of a signal-transmitting and power-transmitting connection of the integrated assembly connectable to at least one of sensors, actuators, input devices, display devices and additional control devices disposed in a cabin of the utility vehicle, and connectable to at least one of sensors, actuators and additional control devices disposed outside the cabin of the utility vehicle.

5. The utility vehicle as claimed in claim 4, wherein the integrated assembly further comprises at least one first plug connector strip for receiving cables from at least one of sensors, actuators, input devices and display devices disposed in the cabin, and at least one second plug connector strip for receiving cables from at least one of sensors and actuators disposed in a region of a frame of the utility vehicle.

6. A utility vehicle, comprising:
multiple electric devices comprising at least one of an electric steering device, an electronic engine controller and an electric brake device;
electronic control devices for controlling the multiple electric devices;
a pedal unit forming an integrated assembly with the electronic control devices, the pedal unit having foot pedals mounted on a pedal carrier thereof; and
at least one of an accelerator pedal, a brake pedal and a clutch pedal mounted on the pedal carrier; and
at least two electronic control devices, which are at least partially functionally redundant, and are combined with the pedal unit to form the integrated assembly.

7. The utility vehicle as claimed in claim 6, wherein each of the at least two electronic control devices monitors itself for faults, and when a fault is detected selectively deactivates itself.

8. The utility vehicle as claimed in claim 7, wherein a functioning one of the electronic control devices detects the deactivation of the electronic control device having the fault, and at least partially takes over functions thereof.

9. The utility vehicle as claimed in claim 6, wherein the at least two electronic control devices monitor each other for faults, and when a first electronic control device detects a fault in a second electronic control device, the first electronic control device not affected by the fault selectively deactivates the second electronic control device affected by the fault.

10. The utility vehicle as claimed in claim 9, wherein, in the event of the fault causing the second electronic control device to be deactivated, the first electronic control device prevents the utility vehicle reaching a safety-critical state.

11. The utility vehicle as claimed in claim 6, further comprising:
at least one of a signal-transmitting and power-transmitting connection of the integrated assembly connectable to at least one of sensors, actuators, input devices, display devices and additional control devices disposed in a cabin of the utility vehicle, and connectable to at least one of sensors, actuators and additional control devices disposed outside the cabin of the utility vehicle.

12. A pedal unit for a utility vehicle, comprising:
a pedal carrier of the pedal unit for mounting control pedals thereon;
at least two electronic control devices jointly controlling a plurality of electric devices of the utility vehicle, the at least two electronic control devices and the pedal carrier forming an integrated assembly; and
an electrical connection of the pedal unit for operatively connecting to at least one of the electric devices disposed in a cabin of the utility vehicle, and the electric devices disposed proximal to a frame of the utility vehicle.

13. The pedal unit according to claim 12, further comprising at least one first plug connector strip for receiving cables from the electric devices disposed in the cabin, and at least one second plug connector strip for receiving cables from the electric devices disposed proximal to a frame of the utility vehicle.

14. The pedal unit according to claim 12, wherein the electric devices disposed in the cabin comprise at least one of sensors, actuators, input devices, display devices and additional control devices.

15. The pedal unit according to claim 12, wherein the electric devices disposed proximal to the frame comprise at least one of sensors, actuators and additional control devices.

16. The pedal unit according to claim 12, wherein the at least two electronic control devices operate at least one of an electric steering device, an electronic engine controller, and an electric brake device.

17. The pedal unit according to claim 12, wherein the integrated assembly forms a junction point for electrical cables extending into the cabin and into the frame of the utility vehicle.

18. A pedal unit for a utility vehicle, comprising:
a pedal carrier of the pedal unit for mounting control pedals thereon;
electronic control devices controlling a plurality of electric devices of the utility vehicle, the electronic control devices and the pedal carrier forming an integrated assembly; and
an electrical connection of the pedal unit for operatively connecting to at least one of the electric devices disposed in a cabin of the utility vehicle, and the electric devices disposed proximal to a frame of the utility vehicle; and
two redundant electronic control devices, wherein, in case of failure of a first electronic control device, a second electronic control device assumes functions of the first electronic control device to prevent an unsafe condition of the utility vehicle.

19. The pedal unit according to claim 18, wherein each of the electronic control devices monitors itself and selectively deactivates itself if a fault is detected.

20. The pedal unit according to claim 18, wherein the second electronic control device selectively deactivates the first electronic control device in case of the failure of the first electronic control device.

* * * * *